United States Patent [19]
Kato

[11] Patent Number: 5,843,857
[45] Date of Patent: Dec. 1, 1998

[54] INORGANIC POROUS BODY AND METHOD FOR PRODUCING THE SAME

[75] Inventor: Hayato Kato, Kariya, Japan

[73] Assignee: Aisin Takaoka Co., Ltd., Toyota, Japan

[21] Appl. No.: 868,804

[22] Filed: Jun. 4, 1997

Related U.S. Application Data

[62] Division of Ser. No. 760,765, Dec. 5, 1996.

[30] Foreign Application Priority Data

Dec. 18, 1995 [JP] Japan ................................. 7-329220

[51] Int. Cl.$^6$ .................................................. C04B 38/00
[52] U.S. Cl. ............................ 501/80; 106/745; 106/753; 106/DIG. 1; 264/333
[58] Field of Search ................................ 501/80; 106/900, 106/DIG. 1, 745, 753; 210/751; 71/903, 25; 264/333, DIG. 49

[56] References Cited

U.S. PATENT DOCUMENTS

| | | | |
|---|---|---|---|
| 4,040,852 | 8/1977 | Jones | 106/709 |
| 5,350,549 | 9/1994 | Boyle | 264/42 |
| 5,362,319 | 11/1994 | Johnson | 106/707 |
| 5,500,044 | 3/1996 | Meade et al. | 106/708 |
| 5,669,969 | 9/1997 | Meade et al. | 106/708 |

FOREIGN PATENT DOCUMENTS

| | | |
|---|---|---|
| 4-349180 | 12/1992 | Japan. |
| 5-170567 | 7/1993 | Japan. |
| 7-25680 | 1/1995 | Japan. |
| 778109 | 7/1957 | United Kingdom. |
| 1153388 | 5/1969 | United Kingdom. |

*Primary Examiner*—Paul Marcantoni
*Attorney, Agent, or Firm*—Oblon, Spivak, McClelland, Maier & Neustadt, P.C.

[57] ABSTRACT

This invention aims to provide an inorganic porous body which can be ensured with high strength and high porosity and which is applicable to soil conditioners. The inorganic porous body has a pellet-shape having pores, includes 50% and more silica by weight, and 20% and more alumina by weight. Also, the inorganic porous body has a porosity of 40% and more by volume. The sludge, which discharged from casting foundries as sludge-wastes and which has an ignition loss of 20%, is utilized as a starting material. The starting material is mixed with water to make a mixture, the mixture is formed to become pellets, and the pellets are burned.

26 Claims, 6 Drawing Sheets

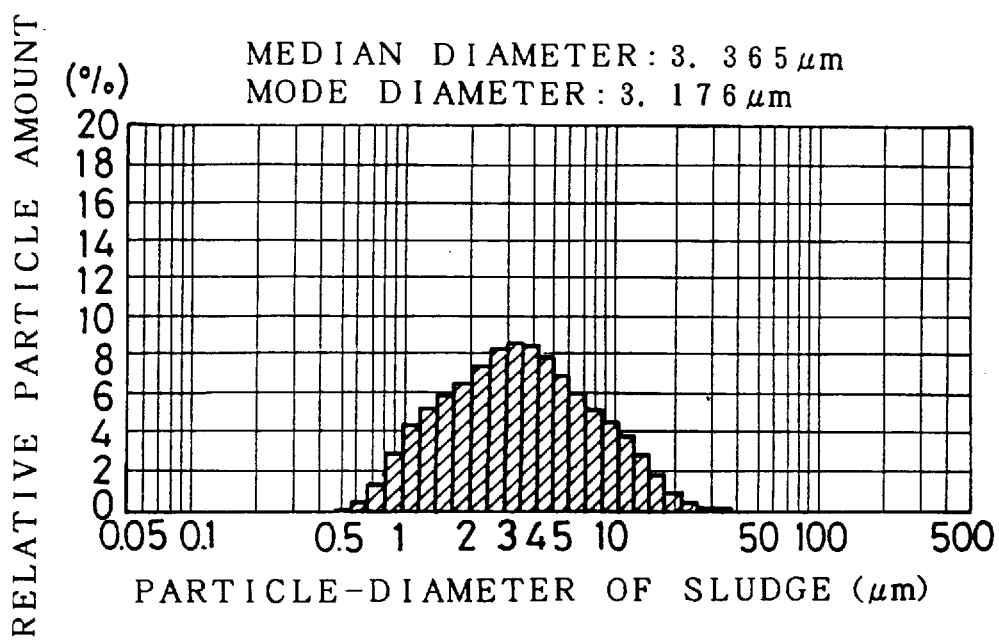
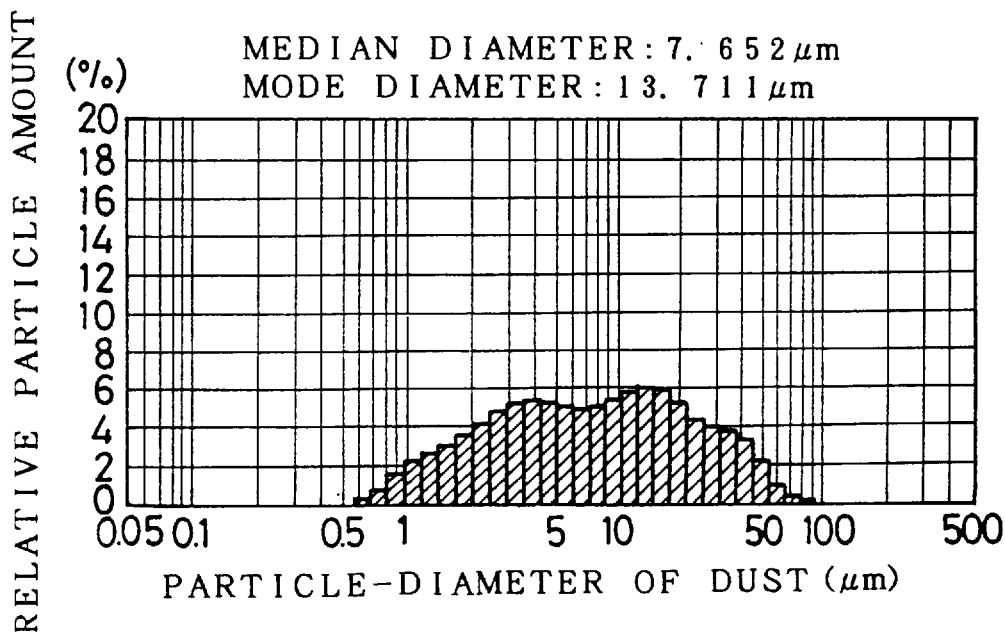

CUMULATIVE PORE-DIAMETER DISTRIBUTION

H1 : EXAMPLE 1
H2 : EXAMPLE 2

DIFFERENTIAL PORE-DIAMETER DISTRIBUTION

K1 : EXAMPLE 1
K2 : EXAMPLE 2

INORGANIC POROUS BODY AND METHOD FOR PRODUCING THE SAME

This is a division of application Ser. No. 08/760,765, filed on Dec. 5, 1996, now pending.

BACKGROUND OF THE INVENTION

1. Field of the Invention

This invention relates to an inorganic porous body having pores and a method for producing the same. The present invention is applicable to, for instance, soil conditioners to be buried in the ground for holding water.

2. Description of the Related Art

Dust, discharged from casting foundries as industrial wastes, includes a large amount of carbon capable of working as a pore-forming substance. In view of such, there has been recently proposed a technique in which dust is utilized to be transformed into an inorganic porous body (Niigata Industrial Technique Center: 1992, Research Report No.21).

According to this technique, dust discharged from casting foundries as industrial wastes is utilized as a starting material. After the starting material is wet-kneaded, a continuous extrusion long-body is formed by use of a extrusion machine. Thereafter, the extrusion long-body is cut at intervals in the longitudinal direction to become a lot of cylindrical pellets having a diameter of approximately 1 mm. Next, the pellets are dried and burned in high temperature regions to transform into inorganic porous bodies. Since this technique can effectively utilize the dust discarded as wastes, it has been promising recently.

Now, according to the inorganic porous body produced by use of the aforementioned technique, the higher strength is, the lower porosity is. Also, the higher porosity is, the lower strength is. Namely, high strength and high porosity are liable to be opposed to each other.

Here, the aforementioned inorganic porous body can be utilized as soil conditioners to be buried in the ground. Even when the inorganic porous body is utilized as soil conditioners, a similar phenomenon is generated. Namely, as for the inorganic porous body, it is preferable that porosity is high for improving water-holding capacity in the ground; however, strength is so lower that the inorganic porous body is easy to be destroyed and pulverized to be short-lived easily.

On the other hand, when porosity of the inorganic porous body is lower, the inorganic porous body is improved in strength, foot-pressure resistance, and weathering-resistance to be long-lived; however, water-holding capacity of the inorganic porous body is lower and the function working as soil conditioners deteriorates in holding water.

Moreover, according to the aforementioned technique, as mentioned above, after the continuous extrusion long-body is formed by use of the extrusion machine, the continuous extrusion long-body is out at intervals in the longitudinal direction by use of a cutter to become a lot of cylindrical pellets, and the pellets are dried and burned. Therefore, in this cut-method, "drooping portions" are easy to occur in a cut surface, so that "drooping portions" may project locally to constitute edge-portions. In this case, it is thought that the edge-portions are easy to be destroyed and strength property such as foot-pressure resistance isn't sufficient even when the inorganic porous body is burned.

SUMMARY OF THE INVENTION

The present invention has been conceived in view of the above circumstances. It is an object of the present invention to provide an inorganic porous body which can ensure strength advantageously with porosity thereof being high and which is suitable to be utilized as soil conditioners to be buried in the ground.

It is another object of the present invention to provide a method for producing an inorganic porous body which can ensure strength advantageously with porosity thereof being high and which is suitable to be utilized as soil conditioners to be buried in the ground.

(1) The present inventors have studied about an inorganic porous body in the long term. As a result, in the case where alumina content in an inorganic porous body is large, the inventors have found that strength of the inorganic porous body is liable to increased with porosity thereof being high, so that they have developed the inorganic porous body of the first aspect of the present invention.

The reason why a large amount alumina content cause strength to be improved in the inorganic porous body isn't clear. However, it is guessed as follows: Although burning in high temperatures is preferable so as to improve strength of the inorganic porous body, liquidus phases may considerably occur undesirably. In such a case, pores of the inorganic porous body are filled owing to solidification of the liquidus phases, and thereby porosity is easy to be decreased considerably. On the other hand, when the burning temperature is suppressed low, burning ability isn't ensured sufficiently and strength of inorganic) porous body is easy to be decreased. This may be caused by the fact that burning in high temperatures can be carried out while suppressing liquidus phases from occurring, in case where alumina content in the inorganic porous body is in a large amount.

Here, with consideration that alumina content in silica-sand which represents casting sand is in the range of from 7 to 8%, and silica content in the silica-sand is in the range of from 87 to 99% ( reference book: Standard Metal Engineer Course "Casting", 40 page, by published Corona Co., Ltd. the thirteenth edition), it is thought that the alumina content in the inorganic porous body concerning the aforementioned research report proposed by Niigata Industrial Technique Center is low to be 10% at the most. Here, the word of "%" herein means wt % unless it is described as volume %.

Moreover, the present inventors have found sludge-wastes discharged from casting foundries includes minute colloidal particles in a considerable amount so that minute particles are included in the sludge-wastes in a large amount. Also, they have found the sludge-wastes includes a large amount of organic substances to be burned during a burning step than general dust-wastes. Accordingly, they have found that strength of inorganic porous body can be increased with porosity thereof provided that sludge obtained from the sludge-wastes is utilized as a starting material. On the basis of this finding, they have developed the third aspect of the method according to the present invention.

Still further, provided that not the aforementioned cut-method for cutting the continuous extrusion long-body to obtain a lot of pellets but a friction-rolled method utilizing friction between a starting material and a stirring wing for obtaining pellets is employed, the present inventors have found that edge-portions of the inorganic porous body are decreased and the inorganic porous body strengthens with porosity thereof being high, even when the dust-wastes discharged from casting foundies is utilized as a starting material in the same way as the aforementioned conventional "Niigata" technique.

On the basis of this finding, the present inventors have developed the third aspect of the present invention.

(2) In the first aspect of the present invention, an inorganic porous body is characterized in that: it has a pellet-shape possessing pores, includes 50% and more silica by weight, and 20% and more alumina by weight; and it has a porosity of 40% and more by volume.

On average, the pore-diameter of inorganic porous body can be set from 0.1 to 20 um (micro meters), in particular, from 1 to 5 um(micro meters). The porosity of the inorganic porous body can be set in the range of from 50 to 70%.

In the second aspect of the present invention, an inorganic porous body may have a non-cylindrical shape.

In the third aspect of the present invention, a method for producing an inorganic porous body uses a staring material which has an ignition loss of 20% and more by weight and in which sludge is utilized as a main constituent, the sludge includes silica and alumina discharged from a casting foundry as sludge-wastes, and comprises the steps of:

forming a pellet-shaped body or a lump-shaped body from a mixture mixing said starting material with water, and heating said pellet--shaped body or said lump-shaped body in the range of 900° C. and more to burn said pellet-shaped body or said lump-shaped body, thereby constituting the inorganic porous body.

The ignition loss means the loss to be burned owing to high-temperature heat during a burning step, it mainly exhibits an amount of organic substances to be burned owing to high-temperature heat, and it doesn't include water.

In the third aspect of the present invention, the sludge working as the starting material can include from 8 to 40% alumina by weight, and 50% and more silica by weight, except for parts which corresponds to the ignition loss. Also the sludge can include from 18 to 40% alumina by weight, and from 50 to 70% silica by weight. The particles constituting the sludge can have a median diameter of 0.1 to 20 um (micro meters), and a mode diameter of 0.1 to 20 um (micro meters), In the fourth aspect of the present invention, a method for producing an inorganic porous body uses a staring material which has an ignition loss of 10% and more and in which dust is utilized as a main constituent, the dust includes silica and alumina discharged from a casting foundry as dust-wastes, and comprises the steps of:

mixing the starting material with water to make a mixture by means of a stirring wing, thereby forming a pellet-shaped body having a non-cylindrical shape, and heating the pellet-shaped body in the range of 900° C. and more to burn the pellet-shaped body, thereby constituting the inorganic porous body.

The dust working as the starting material can include from 9 to 40% alumina, and 50% and more silica (generally, from 50 to 85% silica) by weight, except for parts which correspond to the ignition loss. The particles constituting the dust can have a median diameter of 1 to 50 um (micro meters), and a mode diameter of 1 to 50 um (micro meters), In the fifth aspect of the present invention, the staring material includes carbon-based powder, an average particle-diameter of the carbon-based powder may be larger than an average particle-diameter of particles constituting the sludge. Also, an average particle-diameter of the carbon-based powder may be larger than an average particle-diameter of the particles constituting the dust. The average particle-diameter of carbon-based powder can be set in the range of from 2 to 100 um (micro meters).

In the first aspect of the present invention, the inorganic porous body has a pellet-shape possessing pores, includes 50% and more silica by weight, and 20% and more alumina by weight; and it has a porosity of 40% and more by volume. Therefore, strength of the inorganic porous body can advantageously be ensured with porosity thereof being high. Such inorganic porous body has high porosity to obtain a water-holding property. Also, since such inorganic porous body has strength, destruction-resistance thereof is high. This may be caused by the fact that alumina content is rich in the inorganic porous body. Accordingly, the inorganic porous body of the present invention is suitable for using in floriculture, horticulture, tree-planting, agriculture, cultivation, and the like.

In the second aspect of the present invention, the inorganic porous body is a pellet having a non-cylindrical shape, therefore, edge-portions occurring is suppressed as distinct from the conventional cylindrical shaped inorganic porous body having a tendency for the edge-portions to occur because of cutting with a cutter. As a result, the inorganic porous body is improved in fracture-resistance and life. When the inorganic porous body is used as soil conditioners to be buried in the ground, foot-pressure resistance can be improved.

In the third aspect of the present invention, the sludge, which includes a large amount of organic substances having a tendency to be burned because of heat during a burning step, is utilized as a main constituent. Therefore, the ignition loss of the starting material can be set at 20% and more by weight, and the porosity of the inorganic porous body can be increased. The reason is that portions corresponding to the ignition loss are burned and disappeared to become pores substantially during the burning step. Thus, when the inorganic porous body is used as soil conditioners to be buried in the ground, a water-holding property can be improved.

Moreover, in the third aspect of the present invention, as the starting material, the sludge, including silica and alumina discharged from casting foundries, is utilized. As for the sludge, dry-sludge removing water is preferable. Since the sludge includes a large amount of minute particles of alumina and silica, burning ability of the sludge is improved, and burned strength of the inorganic porous body can advantageously be increased with porosity thereof being high. As a result, the inorganic porous body is improved in fracture-resistance and life. When the inorganic porous body is used as soil conditioners to be buried in the ground, foot-pressure resistance of the inorganic porous body is more improved. When the inorganic porous body is lump-shaped, it can be utilized as a block. In such a case, the durability of block can be improved.

Further, in the third aspect of the present invention, two configurations are usable for constituting the pellet-shaped body. In one configuration, the mixture mixing the starting material with water is stirred by the stirring wing to become a pellet-shaped body by use of the friction between the stirring wing and the starting material. In another configuration, the continuous extrusion long-body formed of the mixture is cut at intervals by use of a cutter to become a lot of pellet-shaped bodies. In the former, edge-portions owing to "drooping portions" occur rarely, so that strength of the inorganic porous body can be more ensured with porosity thereof being high; thus, the inorganic porous body is improved in foot-pressure resistance property, and it is suitable for using as soil conditioners.

In the fourth aspect of the present invention, the dust is utilized which is discharged from casting foundries have an ignition loss of 10% and more by weight. Therefore, porosity can advantageously be high with strength being ensured. The reason is that portions corresponding to the ignition loss become pores substantially.

Moreover, in the fourth aspect of the present invention, since the non-cylindrical shaped pellet is formed, the occurrence of the edge-portions owing to "drooping portions" can be suppressed, as distinct from the conventional technique in which the continuous extrusion long-body is cut at intervals so as to obtain cylindrical pellets. As a result, strength of the inorganic porous body can advantageously be increased with porosity thereof being high.

In fifth aspect of the present invention, carbon-based powder (coal powder, activated carbon powder, graphite powder and the like) is burned and disappeared during the burning step to work as a pore-forming substance, and thereby porosity of the inorganic porous body is liable to be ensured.

Further, the average particle-diameter of the carbon-based powder is larger than the average particle-diameter of the particles constituting the sludge, or the average particle-diameter of the particles constituting the dust; therefore, porosity of the inorganic porous body can advantageously be more improved.

BRIEF DESCRIPTION OF THE DRAWINGS

The present invention will now be shown and described in terms of concrete embodiments thereof with reference to the appended drawings, in which:

FIG. 1 is a graph showing a particle-diameter distribution of particles of sludge;

FIG. 2 is a graph showing a particle-diameter distribution of particles of dust;

DETAILED DESCRIPTION OF THE PREFERRED EMBODIMENTS

The First Preferred Embodiment

In the present embodiment, sludge, discharged from casting foundries as sludge-wastes, is utilized as a starting material. In the present embodiment, the sludge-Wastes, accumulated at a drainage of casting foundries, are filtrated by use of a filter-pressing machine, and sludge-wastes are dried by use of sunlight and heat-treatment to become cake-shaped. In such a way, the sludge-cakes concerning the present embodiment are obtained.

In the aforementioned sludge-wastes, various mud is mixed. For instance, watery-mud including dust discharged from production-lines in casting foundies, and watery-mud constituted by livelihood sludge-water including sewage-water discharged from dining rooms and toilets in casting foundries. Thus, a large amount of organic substances are included in the sludge-wastes, and they are burned and disappeared in burning step; the ignition loss is large in the sludge-wastes.

FIG. 1 shows an example in particle-diameter distribution about particles constituting the sludge utilized in the First Preferred Embodiment. In FIG. 1, the horizontal axis shows particle-diameter of the particles constituting the sludge, and the vertical axis shows relative particle amount (wt %). As shown in FIG. 1, the particles constituting the sludge had a median diameter of 3.365 um (micro meters) and a mode diameter of 3.176 um (micro meters). In such a manner, the particles constituting the sludge are easy to become minute. Here, the median diameter means the central value in diameter, and the mode diameter means the most frequent diameter. The median diameter and the mode diameter work as the average-diameter.

The sludge includes more than 50% by weight of silica, and more than 20% by weight of alumina. Therefore, the sludge has so highly alumina content that an inorganic porous body having high-strength can be advantageously produced.

In the present Embodiment, the aforementioned sludge-cakes are dried, and thereafter they are crushed minutely. Further, the crushed sludge-cakes are disposed in a kneading machine 10 illustrated schematically in FIG. 3(A). The crushed sludge-cakes are properly mixed with water to become 10 to 30% by weight of water, and they are kneaded by use of the kneading machine 10 to be transformed into a mixture. Here, the phrase of "10 to 30% by weight of water" means that water is included 10 to 30%, when the mixture included the starting material sludge and the water is 100%.

Utilizing the method mixing dried sludge-cakes with water can be advantageous in adjusting water content of the mixture and in ensuring pelletization. From this regard, dried sludge-cakes are advantageous as sludge.

Figure 3A:
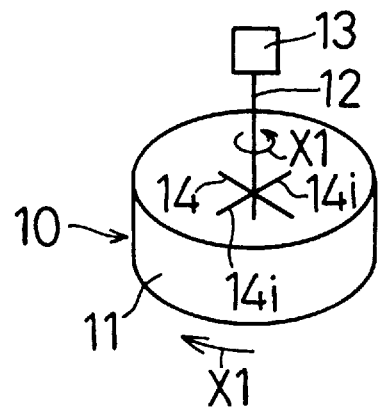
FIG. 3 is a constitutional view of a kneading machine for forming pellets.
Figure 3B:
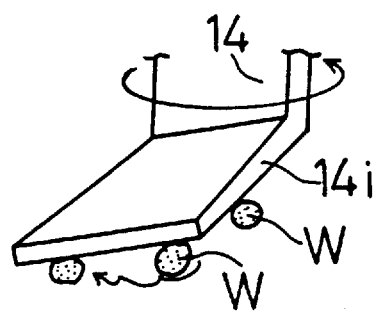

The kneading machine 10 illustrated in FIG. 3 has a container 11, a rotating shaft 12, a motor 13, and a plurality of stirring wings 14. The container 11 having the bottom is inclined with respect to the horizontal line, and it is capable of receiving the starting material and capable of rotating in the direction of the arrow X1. The rotating shaft 12 is capable of rotating in the direction of the arrow X2, the motor 13 is capable of rotating the rotating shaft 13, and the stirring wing 14 is held on the the rotating shaft 13 in the container 11.

FIG. 3 (B) shows the stirring wing 14 schematically. As shown in FIGS. 3(A)(B), the stirring wing 14 comprises a plurality of plate-shaped wings 14$i$. The rotation of the plate-shaped wings 14$i$ rolls the starting material thereunder to pelletize a lot of pellets gradually, thereby growing pellets "W".

Perhaps the pelletization progresses as follows: Since the plate-shaped wings 14$i$ are inclined with respect to the bottom of the container 11, grains with solid-mass work as nucleuses. The nucleuses are pressed against the starting material piled up on the bottom of the container 11, so that the pelletization of pellets "W" progress. In the First Preferred Embodiment, the starting material is pelletized to become a lot of raw pellets "W" having a diameter of, for example, 0.3 to 20 mm. In the First Preferred Embodiment, pellets "W" may be set over 20 mm or 30 mm in a diameter.

Figure 4:
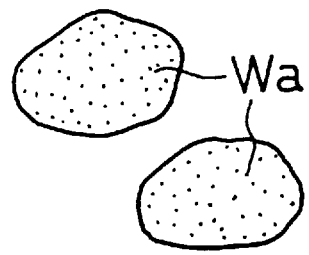
FIG. 4 is a perspective view showing representative configurations of an inorganic porous body.

Generally, in the pelletization, shortening the pelletizing time is preferable for decreasing a pellet-diameter, and elongating the palletizing time is preferable for increasing a pellet-diameter. The pellets "W", produced on the basis of the aforementioned process, are heated and held at a temperature of 140° C. for 60 minutes for dry-treatment, and thereby water is removed from the pellets "W". Thereafter, the pellets "W" are burned at 1000° C. for over 30 minutes in the atmosphere, and thereby a plurality of the inorganic porous bodies are constituted. As schematically illustrated in FIG. 4, the inorganic porous body "Wa" constitutes a pellet having an oval-shape.

When burning temperature is too high, liquidus phases occur excessively, and porosity of the inorganic porous body is liable to be decreased in spite of the fact that strength thereof is improved. Therefore, heating at the excessive high burning temperature isn't desirable. In the First Preferred Embodiment, the ignition loss of the starting material is over 20%. The ignition loss means the weight-loss resulting from burning in high temperatures with respect to the state in which water is removed owing to dry-treatment. In the First Preferred Embodiment, after the test specimen is dried at 140° C. for 60 minutes for removing water. The weight of the test specimen is measured as "W1". Also, after the test specimen is burned, the weight of the test specimen is measured as "W2". Provided that the difference between "W1" and "W2" in weight is exhibited as "(delta)W", the ignition loss is calculated as follows:

ignition loss={[(delta)W]/[W1]}×100%

The sludge includes numerous organic substances which are burned down and disappeared because of heating during the burning step; therefore, the ignition loss is large. In such sludge, the ignition loss is liable to vary depending on sludge-collecting locations. Thus, as for the ignition loss of the starting material, 20% or more, 25% or more, 30% or more, and 35% or more may be utilized.

The inventors have measured the aforementioned inorganic porous body after the burning step, the porosity thereof was 50% or more, 60% or more, and 65% or more. This results may be caused by the fact that pore-volume increases because the ignition loss is large in the starting material. Since the sludge-wastes constituting the sludge includes livelihood sludge-water in which the organic substances to be burned down come to be rich, porosity of the inorganic porous body is easy to be ensured.

Here, the porosity is calculated by volume, namely, it is calculated as follows:

porosity=(pore-volume of inorganic porous body)/(apparent volume of inorganic porous body)×100%

Table 1 shows sludge-composition before and after burning, the ignition loss, and the porosity of the inorganic porous body constituted from the sludge, as an example.

[Table 1]

The composition analysis results shown in Table 1 is carried out by use of fluorescence X-ray method. The composition shown in Table 1 doesn't include parts which corresponds to the ignition loss in before and after burning. This is similar to Tables 2,3 described later.

Table 2 shows the sludge-compositions before and after the burning, the ignition loss, and the porosity of the inorganic porous body constituted from the sludge in which is collected at the same locations as that of Table 1 at different days. Table 2 indicates that the sludge includes 20% and more alumina by weight; therefore, strength of the inorganic porous body after the burning is advantageously increased. Also, since the ignition loss of the sludge was more than 20% to become high, the porosity of the inorganic porous body after the burning is advantageously ensured. In this connection, as understood in Table 2, the porosity of the inorganic porous body was 48% or more.

[Table 2]

In Tables 1 and 2, the ratio of (alumina/silica) is in the range of from 0.3 to 0.6. The ratio may be set in the range of from 0.1 to 1.

According to the First Preferred Embodiment, burning temperature can be selected depending on kinds of the starting material, the suppressing of a liquidus phase in occurrence is preferable in order to increase porosity of the inorganic porous body. On the other hand, the occurring of a liquidus phase increases strength of the inorganic porous body probably.

However, in order to increase porosity, burning temperature not to generate a liquidus phase is preferable. Also, even when a liquidus phase occurs, burning temperature is preferable in a region where little liquidus phase occurs. In view of such circumstances, in accordance with kinds of the starting material. The upper limit of the burning temperature can be set at 1000° C., 1050° C., 1100° C., and 1200° C.; the lower limit of the burning temperature can be set at 800° C., 850° C., 900° C., and 950° C., These options in temperature are similar in the other Embodiments.

In the First Preferred Embodiment, not only a pellet body but also a lump body or a bulky body may be formed as a inorganic porous body.

Second Preferred Embodiment

The Second Preferred Embodiment is substantially the same as the First Preferred Embodiment in construction except for coal powder. Namely, in the First Preferred Embodiment, the sludge which doesn't include coal powder is utilized as the starting material. On the other hand, in the Second Preferred Embodiment, sludge utilized as a starting material includes coal powder working as carbon-based powder.

In accordance with the Second Preferred Embodiment, the coal powder to be burned and disappeared during the burning step is included in the starting material in addition to the sludge including organic substances. Therefore, the ignition loss is liable to be increased more. Accordingly, the ignition loss of the starting material concerning the Second Preferred Embodiment exceeds 24% or 30% sometimes. Also, it can exceed 35% in accordance with kinds of sludge and coal powder.

Use of the starting material having a large amount of ignition loss allows the porosity of inorganic porous body to be ensured largely. The porosity can be expected to exceed 40%,45%,50%,60%, and 65% in accordance with kinds of the starting material.

In the Second Preferred Embodiment, the average particle-diameter of the coal powder is larger than that of particles constituting the sludge.

Third Preferred Embodiment

The Third Preferred Embodiment is substantially the same as the First Preferred Embodiment in construction except for a starting material. Namely, the Third Preferred Embodiment is different from the First Preferred Embodiment in that the dust, discharged as dust-wastes from dustcollectors of casting foundries for producing (cast iron, is utilized as a starting material.

FIG. 2 shows particle-diameter distribution of the dust utilized in one example of the Third Preferred Embodiment. The horizontal axis of FIG. 2 shows particle-diameter of the dust, and the vertical axis thereof shows a relative particle amount(wt %). As shown in FIG. 2, in particle-diameter, the particles constituting the dust had a median diameter of 7.652 um (micro meters) and a mode diameter of 13.711 um (micro meters). As understood from comparison between. FIG. 1 concerning the sludge and FIG. 2 concerning the dust, the dust had a lot of particles whose particle-diameter is larger than particle-diameter of the sludge; to put it concretely, there are a lot of dust-particles having a diameter exceeding 10 um (micro meters) in the present Embodiment.

This dust includes 50% or more silica and 10% or more alumina by weight. No.1A and No.2A in Table 3 show the dust-composition as examples before burning step. Also, Table 3 shows the ignition loss, and the porosity of the inorganic porous body constituted from the dust.

As understood in Table 3, in the dust utilized in the Third Preferred Embodiment, alumina content and ignition loss of the dust are decreased as compared to those of the sludge. It is thought that the ignition loss of the dust is decreased as compared to that of the sludge, because the dust comes from casting sand for casting high-temperature melt to be heated during casting.

[Table 3]

Test Examples

1. Example 1, Example 2

In Example 1, sludge, which doesn't include coal powder, is utilized as a starting material, and thereby an inorganic porous body is formed on the basis of the method of the First Preferred Embodiment. In Example 1, particle-diameter distribution of particles in the sludge is the same as results shown in Table 1. Also, the composition of the sludge working as the starting material, the ignition loss, and so on are the same as the results shown in Table 1. In the Example 1, the burning temperature was 1000° C., the burning time was 120 minutes, the porosity of the inorganic porous body was 51%.

In Example 2, sludge including coal powder is utilized as a starting material, an inorganic porous body is formed on the basis of the method of the Second Preferred Embodiment. As for the starting material concerning Example 2, coal powder:sludge =1:10 by weight. Thus, a mixture is adjusted to has 20% water. Characteristic Line K3 in FIG. 5(B) indicates the grading degree of the coal powder.

Particle-diameter distribution of particles in the sludge concerning Example 2 is basically the same as that of the First Preferred Embodiment. Also, the composition of the sludge working as the starting material, the ignition loss, and so on are the same as the those of Example 1. In the Example 2, the burning temperature was 1000° C., the burning time was 120 minutes, the porosity of the inorganic porous body was 67%.

Figure 5A:
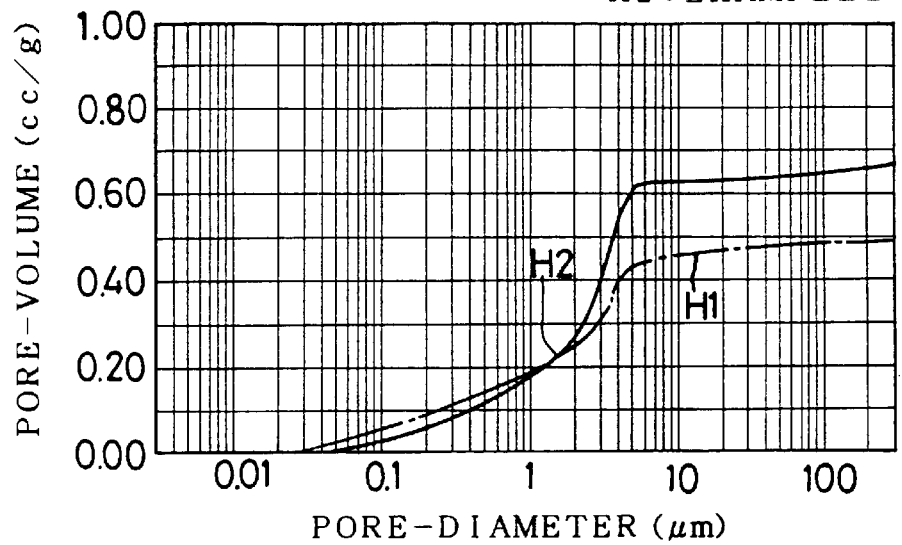
FIG. 5(A) is a graph showing pore-diameter distribution concerning Examples 1,2.

The inventors have measured the pores of the inorganic porous body after the burning step in both of Example 1 and Example 2. In measurement, a porosimeter (made by Simazu-Micromeritix Co., Ltd.) having mercury-inserting method was utilized. After the test specimen was immersed in mercury, the mercury was pressed to insert the pores of the test specimen; pores distribution is measured on the basis of a mercury amount inserted into the test specimen and a pressure value measured with the porosimeter. FIGS. 5 (A)(B) shows measured results. The horizontal axis in FIG. 5(A) shows pore-diameter of the inorganic porous body; the vertical axis in FIG. 5(A) shows pore-volume of the inorganic porous body. Characteristic Line H1 in FIG. 5(A) shows pores-volumes cumulated from the small side of pore-diameter in the inorganic porous body concerning Example 1 in which the sludge working as a starting powder doesn't include coal powder. Characteristic Line H2 in FIG. 5(A) shows pores-volumes cumulated from the small side of pore-diameter in the inorganic porous body concerning Example 2 in which the sludge working as a starting powder includes coal powder.

Figure 5B:
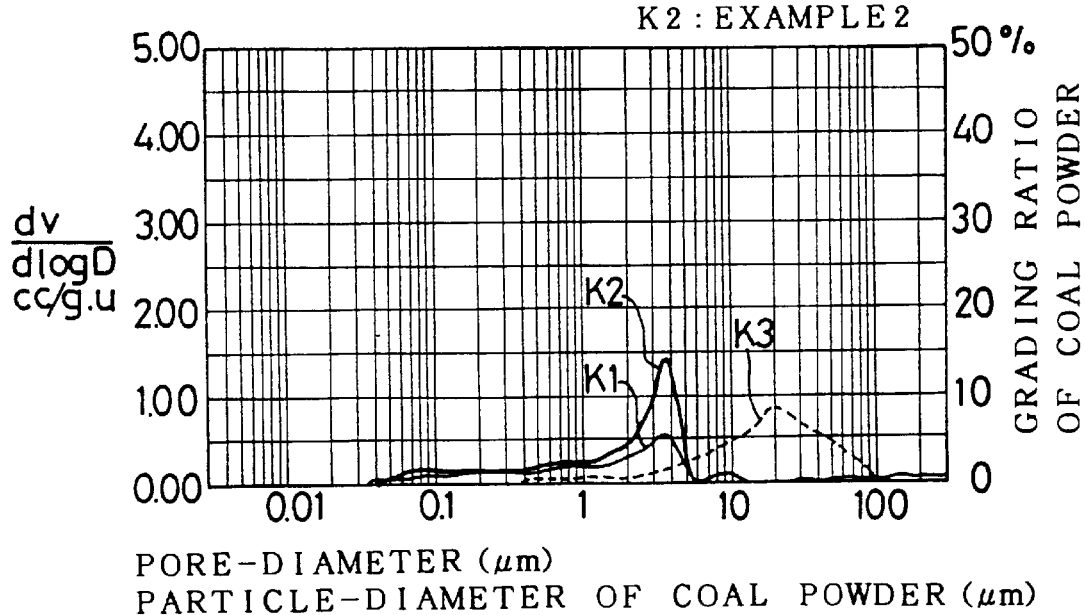
FIG. 5(B) is a graph showing pore-diameter distribution and coal powder particle-diameter distribution concerning Examples 1,2.

The horizontal axis in FIG. 5(B) shows pore-diameter of the inorganic porous body and particle-diameter of the coal powder; the left side of the vertical axes shows differentiated value of the characteristic lines illustrated in FIG. 5(A), that is, an inclination of the characteristic lines illustrated in FIG. 5(A). The right side of the vertical axes shows a grading ratio of the coal powder.

Characteristic Line K1 in FIG. 5(B) shows pores-diameter distribution of the inorganic porous body concerning Example 1 in which the sludge working as a starting powder doesn't include coal powder. As shown by Characteristic Line K1 in FIG. 5(B), the maximum frequency region of pores-diameter was 3 to 4 um (micro meters) in Example 1.

Characteristic Line K2 in FIG. 5(B) shows pore-diameter distribution in the inorganic porous body concerning Example 2 in which the sludge working as a starting powder includes coal powder. As shown by Characteristic Line K2 in FIG. 5(B), the maximum frequency region of pores-diameter was 3 to 4 um (micro meters) in Example 2. In this way, the pore-diameter concerning Example 1 was similar to the pore-diameter concerning Example 2 in the maximum frequency region. Probably, this reason is that the inorganic porous body contracts during the burning step and the contraction influences that results. Also, a peak of Characteristic Line K2 is higher than that of the Characteristic Line K1.

Characteristic Line K3 in FIG. 5(B) shows particle-diameter of the coal powder mixed in the starting material of Example 2. As apparent from comparison between Characteristic Line K2 and Characteristic Line K3, the pore-diameter of the inorganic porous body formed by the starting material including the coal powder is smaller than particle-diameter of the coal powder. This result may be caused by the fact that the inorganic porous body contracts during burning step.

2. Example 3, Example 4

In Example 3, sludge which doesn't include activated carbon powder is utilized as a starting material, and thereby an inorganic porous body is formed on the basis of the method of the First Preferred Embodiment. Particle-diameter distribution of particles of the sludge concerning Example 3 is substantially the same as results shown in FIG. 1. Also, the composition of sludge working as the starting material, the ignition loss, and so on are substantially the same as the results shown in Table 1. In Example 3, the burning temperature was 1000° C., the burning time was 120 minutes, the porosity of the inorganic porous body was 51%.

In Example 4, activated carbon powder is utilized instead of coal powder. Also, sludge including the activated carbon powder is utilized as a starting material, and thereby an inorganic porous body is formed on the basis of the method of the Second Preferred Embodiment. As for the starting material concerning Example 4, activated coal powder:sludge=1:10 by weight. Thus, a mixture is adjusted to has 20% water.

Figure 6A:
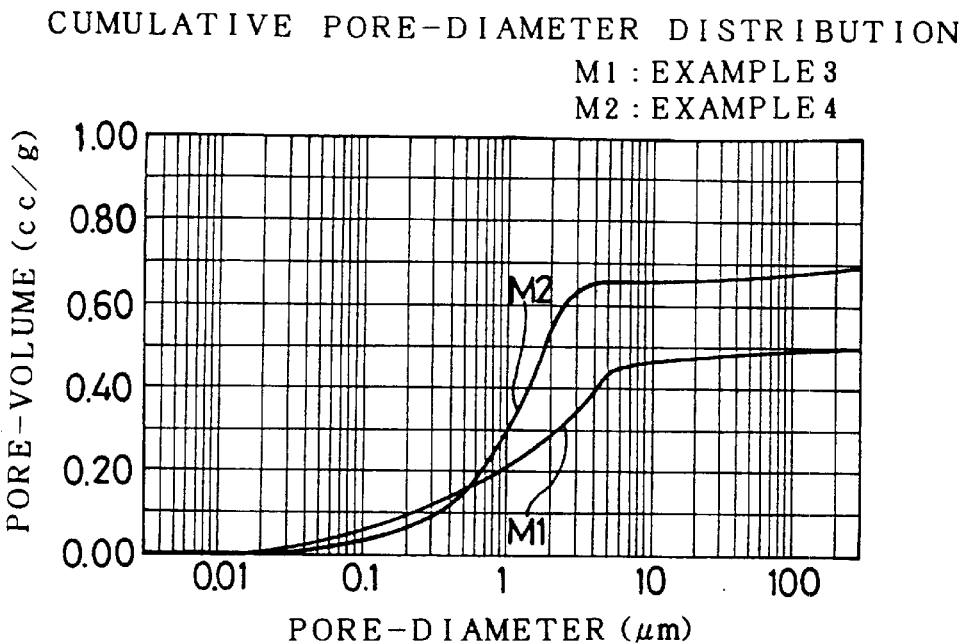
FIG. 6(A) is a graph showing pore-diameter distribution concerning Examples 3,4.
Figure 6B:
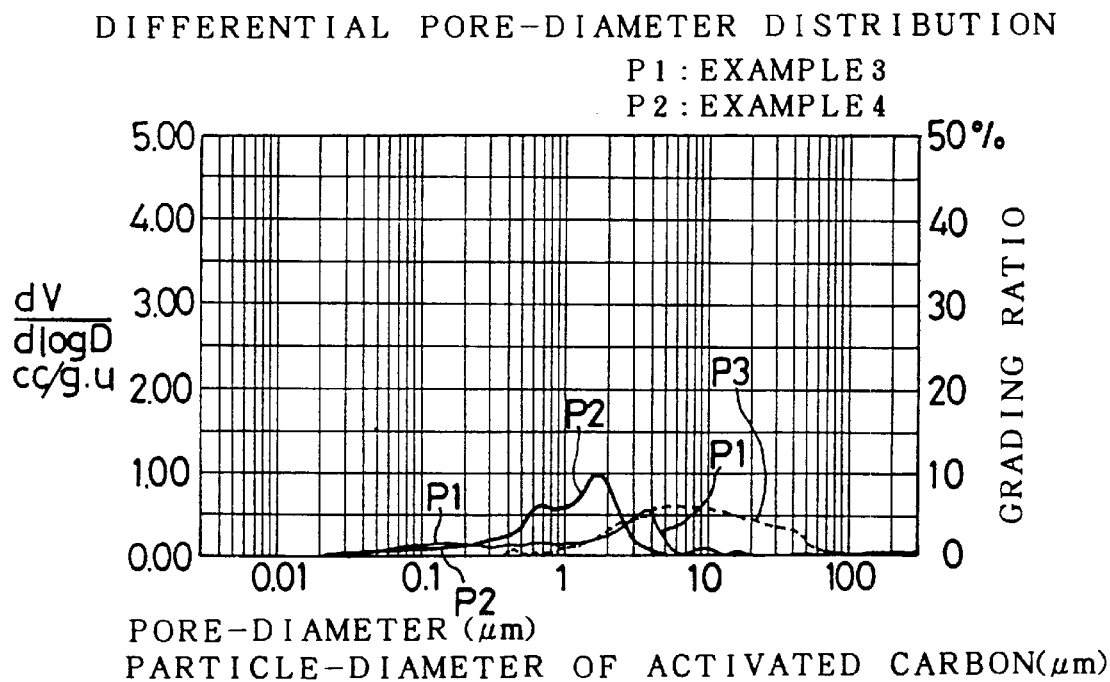
FIG. 6(B) is a graph showing distribution and coal powder particle-diameter concerning Examples 3,4.

A grading degree of the activated carbon powder is indicated as Characteristic Line P3 in FIG. 6(B).

Particle-diameter distribution of particles in the sludge concerning Example 4 is basically the same as that of FIG. 1. Also, the composition of the sludge working as the starting material, the ignition loss, and so on are the same as those of Table 1. In Example 4, the burning temperature was 1000° C., the burning time was 120 minutes, the porosity of the inorganic porous body was 69%.

The inventors have measured the pores of inorganic porous body after the burning step in both of Example 3 and Example 4 on the basis of the method mentioned above.

FIGS. 6 (A) (B) show the measured results. The vertical axis of FIG. 6(A) corresponds to that of FIG. 5(A), and the vertical axis of FIG. 6(A) corresponds to that of FIG. 5(A). The horizontal axis of FIG. 6(B) corresponds to that of FIG. 5(B), and the horizontal axis of FIG. 6(B) corresponds to that of FIG. 5(B). Characteristic Line M1 in FIG. 6(A) shows pore-volumes cumulated from the small side of pore-diameter in the inorganic porous body concerning the Example 3 in which the sludge working as the starting powder doesn't include activated carbon powder. Characteristic Line M2 in FIG. 6(A) shows pore-volumes cumulated from the small side of pore-diameter in the inorganic porous body concerning the Example 4 in which the sludge working as the starting material includes activated carbon powder.

Characteristic Line P1 in FIG. 6(B) shows pore-diameter distribution in the burned inorganic porous body in which the sludge working as the starting material doesn't include activated carbon powder. Characteristic Line P1 is the same as Characteristic Line K1 in FIG. 5(B). As apparent from Characteristic Line P1, the maximum frequency region of pores-diameter was 3 to 4 um (micro meters) in the burned inorganic porous body formed by the starting material which doesn't include activated carbon powder.

Characteristic Line P2 in FIG. 6(B) shows pore-diameter distribution in the burned inorganic porous body concerning the Example 4 in which the sludge working as the starting material includes activated carbon powder. As shown by Characteristic Line P2 in FIG. 6(B), the maximum frequency region of pore-diameter was 1 to 2 um (micro meters) in Example 4 in which the starting material includes activated carbon powder.

On the other hand, a dotted line, Characteristic Line P3 shows grading distribution of the activated carbon powder used in Example 4. Characteristic Line P3 shows that the maximum frequency region of pore-diameter was 3 to 10 um (micro meters) in the activated carbon powder. As understood at Characteristic Line P3 in comparison with the Characteristic Line P2, the average pore-diameter of the inorganic porous body is smaller than the average particle-diameter of the activated carbon powder. Probably, the reason is that the inorganic porous body contracts during the burning step.

3. Example 5

In Example 5, sludge, which doesn't include coal powder and activated carbon powder, is utilized as a starting material, and thereby an inorganic porous body is formed on the basis of the method of the Third Preferred Embodiment. Particle-diameter distribution of particles of the dust concerning Example 5 is the same as results shown in FIG. 2. Also, the composition of the dust working as the starting material, the ignition loss, and so on are substantially the same as the results of No.2A shown in Table 3. In Example 5, the burning temperature was 1000° C., the burning time was 120 minutes, the porosity of the inorganic porous body was 42%.

The inventors have measured the pores of the burned inorganic porous body of Example 5 on the basis of the method mentioned above.

Figure 7A:
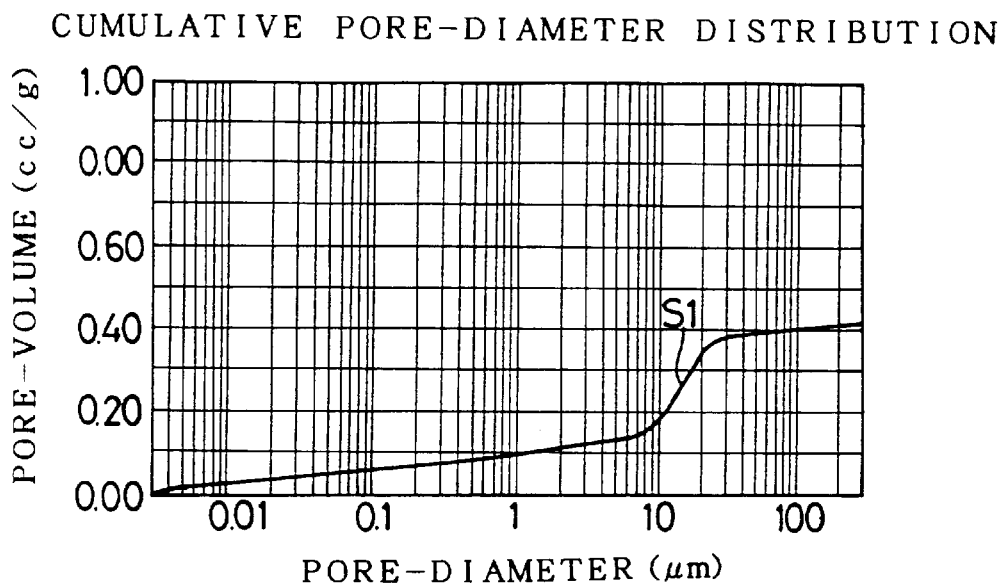
FIG. 7(A) is a graph showing pore-diameter distribution concerning Example 5.
Figure 7B:
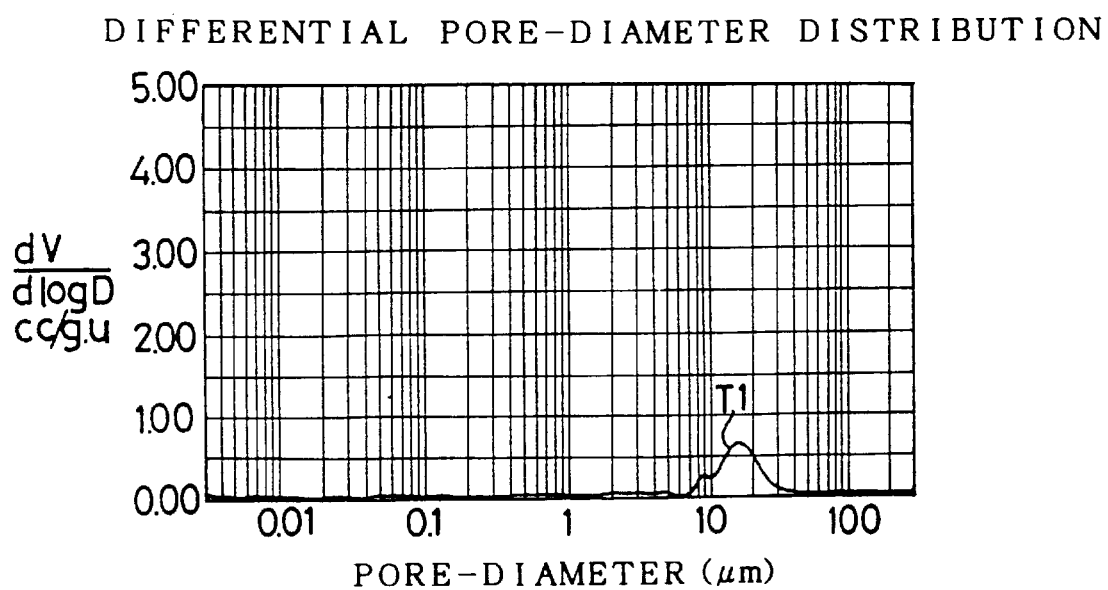
FIG. 7(B) is a graph showing pore-diameter distribution concerning Example 5.

FIGS. 7 (A)(B) shows the measured results. The vertical axis of FIG. 7(A) corresponds to that of FIG. 5(A), and the vertical axis of FIG. 7(A) corresponds to that of FIG. 5(A). The vertical axis of FIG. 7(B) corresponds to that of FIG. 5(B), and the horizontal axis of FIG. 7(B) corresponds to that of FIG. 5(B).

Characteristic Line S1 in FIG. 7(A) shows pore-volumes cumulated from the small side of pore-diameter in the inorganic porous body concerning the Example 5.

Characteristic Line T1 in FIG. 7(B) is a differentiated line of Characteristic Line S1, and shows pore-diameter distribution of the burned inorganic porous body. As apparent from Characteristic Line T1 in FIG. 7(B), the maximum frequency area was 10 to 20 um (micro meters) in pore-diameter.

From comparison between FIG. 1 concerning the sludge and FIG. 2 concerning the dust, in the inorganic porous body made from the dust, it is assumed that the pore-diameter of the burned inorganic porous body may be large, because the average particle-diameter of the dust is considerably large the average particle-diameter of the sludge.

4. Strength Test

The inventors have measured strength of the burned inorganic porous body. In this strength test, an inorganic porous body whose target-diameter is 2 mm is placed an upper surface of the horizontal table capable of rising and falling. Next, the horizontal table is risen at a low speed to press the inorganic porous body against a cage body disposed over the horizontal table and to crush the inorganic porous body. The strength is estimated as a load by which the inorganic porous body is crushed.

In this strength test, Specimen A corresponds to Example 1, and it exhibits an inorganic porous body made from a starting material constituted by the sludge which doesn't include coal powder. Specimen B corresponds to Example 5, and it exhibits an inorganic porous body made from a starting material constituted by dust including no coal powder. Specimen C corresponds to Example 2, and it exhibits an inorganic porous body made from a starting material constituted by the sludge mixed with coal powder.

Further, as an comparable example, Specimen D is constituted by an inorganic porous body made from diatomaceous earth. In Specimen D, the burning temperature was 1000° C. and the burning time was 120 minutes. Also, Specimen D is applied to the strength test similarly.

In addition, as for Specimens A to D, the strength test is carried out in the case where the inorganic porous body is in dried state and in the case where the inorganic porous body is dampened state by holding the specimen under water for 24 hours. In the latter case, it is under consideration that the inorganic porous body is in water-holding state when it is utilized in the ground as soil conditioners.

Figure 8:
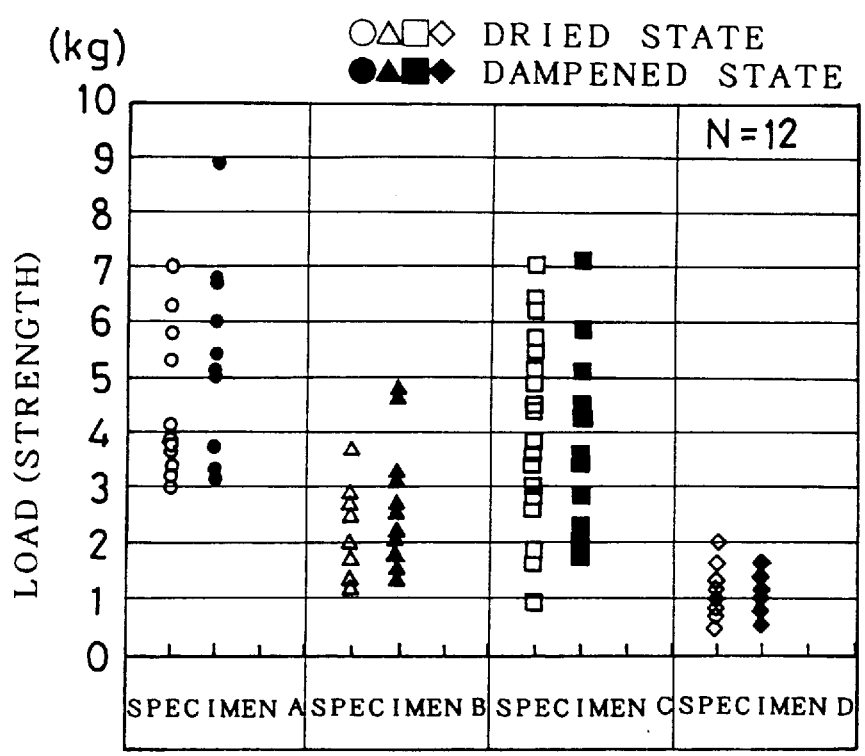
FIG. 8 is a graph showing result in a strength test of an inorganic porous body.

FIG. 8 shows the test results. In FIG. 8, the marks painted in black, such as the blackened circle and the blackened square, exhibit that the inorganic porous body is in dampened state.

In FIG. 8, the marks painted in white, such as the whitened circle and the whitened square, exhibit that the inorganic porous body is in dried state. The number of sample in Specimens A to D was twelve respectively.

FIG. 8 shows that the average strength of Specimen A, the average strength of Specimen B, the average strength of Specimen C are high. Here, Specimens A to C are concerning the present invention.

On the other hand, the average strength of Specimen D concerning the comparable example is lower. This may be caused by the fact that alumina content is lower in the diatomaceous earth constituting Specimen D.

Moreover, in comparison between Specimens A and C utilizing the sludge and Specimen B utilizing the dust, Specimens A and C are superior to Specimen B in the average strength. This may be caused by the fact that the sludge is larger than the dust in alumina content as understood from comparison between Tables 1 and 2, and the particles of the sludge are minuter than those of the dust.

The strength tests are similarly carried out in case where target-diameter of the inorganic porous body are 4 mm, 6 mm, 10 mm in the inorganic porous body. Also, the strength test similarly is carried out in case where the target-diameter of inorganic porous body is more than 20 mm. In accordance with this results, since the sludge has high alumina content and the particles of the sludge have a small particle-diameter, the specimens constituted by the sludge are superior to the specimens constituted by the dust in the average strength.

TABLE 1

Starting Material: Sludge

|  | $SiO_2$ % | $Al_2O_3$ % | CaO % | MgO % | FeO % | IGNITION LOSS % | POROSITY % |
|---|---|---|---|---|---|---|---|
| BEFORE BURNING | 60.6 | 22.4 | 2.07 | 2.93 | 8.27 | 26.5 | — |
| AFTER BURNING | 59.4 | 23.3 | 2.35 | 3.19 | 7.93 | 0.1 | 51.2 |

TABLE 2

Starting Material: Sludge

|  |  | $SiO_2$ % | $Al_2O_3$ % | CaO % | MgO % | FeO % | IGNITION LOSS % | POROSITY % |
|---|---|---|---|---|---|---|---|---|
| No. 1 | BEFORE BURNING | 61.7 | 21.8 | 2.11 | 3.14 | 7.67 | 24.4 | — |
|  | AFTER BURNING | 58.9 | 23.0 | 3.18 | 3.33 | 7.53 | 0.08 | 48.8 |
| No. 2 | BEFORE BURNING | 60.7 | 22.7 | 2.05 | 3.11 | 7.96 | 24.3 | — |
|  | AFTER BURNING | 60.8 | 22.9 | 2.18 | 3.26 | 7.42 | 0.12 | 49.5 |
| No. 3 | BEFORE BURNING | 61.2 | 22.6 | 1.97 | 3.13 | 7.61 | 26.0 | — |
|  | AFTER BURNING | 60.1 | 23.7 | 2.18 | 3.29 | 7.23 | 0.08 | 50.3 |

TABLE 3

Starting Material: Dust

|  | $SiO_2$ % | $Al_2O_3$ % | CaO % | MgO % | FeO % | IGNITION LOSS % | POROSITY % |
|---|---|---|---|---|---|---|---|
| No. 1A | 79.0 | 10.1 | 2.4 | 2.3 | 3.5 | 13.6 | 34 |
| No. 2A | 79.0 | 12.0 | 1.4 | 1.4 | 2.5 | 23.3 | 42 |

What is claimed is:

1. A method for producing an inorganic porous body, using a starting material which has an ignition loss of 20% or more by weight comprising sludge as a main constituent, said sludge including silica and alumina discharged from a casting foundry as sludge-wastes, comprising the steps of:

forming a pellet-shaped body or a lump-shaped body from a mixture obtained by mixing said starting material with water, and heating said pellet-shaped body or said lump-shaped body at a temperature of at least 800° C. to burn said pellet-shaped body or said lump-shaped body so as to obtain said inorganic porous body.

2. The method according to claim 1, said sludge includes from 8 to 40% alumina by weight, and 50% and more silica by weight, except for parts which correspond to the ignition loss.

3. The method according to claim 1, wherein the mode diameter is in the range of from 0.1 to 20 μm, and the median diameter is in the range of from 0.1 to 20 μm in particles constituting said sludge.

4. The method according to claim 1, wherein said starting material includes carbon-based powder, an average particle-diameter of said carbon-based powder being larger than an average particle-diameter of particles constituting said sludge.

5. The method according to claim 1, wherein said carbon-containing powder is at least one material selected from the group consisting of coal powder, activated carbon powder, and graphite powder.

6. The method according to claim 4, wherein said inorganic porous body is utilized as a soil conditioner.

7. A method for producing an inorganic porous body, using a starting material which has an ignition loss of 10% or more by weight comprising dust as a main constituent, said dust including silica and alumina discharged from a casting foundry as dust-wastes, comprising the steps of:

mixing said starting material with water to make a mixture by means of a stirring wing, thereby forming a pellet-shaped body having a non-cylindrical shape, and heating said pellet-shaped body at a temperature of at least 800° C. to burn said pellet-shaped body so as to obtain said inorganic porous body.

8. The method according to claim 7, wherein said starting material includes carbon-containing powder, an average particle-diameter of said carbon-containing powder being larger than an average particle-diameter of said dust.

9. The method according to claim 7, wherein said carbon-based powder is at least one material selected from the group consisting of coal powder, activated carbon powder, and graphite powder.

10. The method according to claim 1 wherein an average particle-diameter of said carbon-containing powder is in the range of from 2 to 100 $\mu$m.

11. The method according to claim 7, said dust includes from 9 to 40% alumina by weight, and from 50 to 85% silica by weight, except for parts which correspond to the ignition loss.

12. The method according to claim 7, wherein the mode diameter is in the range of from 1 to 50 $\mu$m, and the median diameter is in the range of from 1 to 50 $\mu$m in particles constituting said dust.

13. The method according to claim 7, wherein said inorganic porous body is utilized as a soil conditioner.

14. The method according to claim 1, wherein said inorganic porous body comprises at least 50% silica by weight and at least 20% alumina by weight, has a porosity of at least 40% by volume and comprises pores having 0.1 to 20 $\mu$m in pore-diameter.

15. The method according to claim 1, wherein the pore-diameter is in the range of from 1 to 5 $\mu$m in said inorganic porous body.

16. The method according to claim 1, wherein pores of said inorganic porous body have a mountain-shaped distribution in the range of from 0.1 to 20 $\mu$m.

17. The method according to claim 1, wherein the porosity of said inorganic porous body is in the range of from 50 to 70%.

18. The method according to claim 1, wherein said pellet-shaped body or said lump-shaped body is formed by stirring said starting material with water by means of a stirring wing in a container.

19. The method according to claim 1, wherein the heating temperature is in the range of from 800° to 1200° C.

20. The method according to claim 1, wherein the size diameter of inorganic porous body is in the range of from 0.1 to 40 mm.

21. The method according to claim 7, wherein said inorganic porous body comprises at least 50% silica by weight and at least 20% alumina by weight, has a porosity of at least 40% by volume and comprises pores having 0.1 to 20 $\mu$m pore-diameter.

22. The method according to claim 7, wherein said inorganic porous body comprises pores whose pore-diameter is in the range of from 8 to 30 $\mu$m.

23. The method according to claim 7, wherein pores of said inorganic porous body have a pore size distribution in the range of from 1 to 60 $\mu$m.

24. The method according to claim 7, wherein the porosity of said inorganic porous body is in the range of from 50 to 70%.

25. The method according to claim 7, wherein the size diameter of inorganic porous body is in the range of from 0.1 to 40 mm.

26. The method according to claim 7, wherein the heating temperature is in the range of from 800° to 1200° C.

* * * * *